United States Patent
Kim et al.

(10) Patent No.: US 9,300,240 B2
(45) Date of Patent: Mar. 29, 2016

(54) METHODS AND APPARATUSES FOR OBTAINING MAXIMUM MAGNETIC FLUX OF PERMANENT MAGNET SYNCHRONOUS MOTORS

(71) Applicant: Samsung Electronics Co., Ltd., Suwon-Si, Gyeonggi-Do (KR)

(72) Inventors: Hyun-bae Kim, Yongin-si (KR); Jong-soo Kim, Suwon-si (KR); Jei-hoon Baek, Seoul (KR); Kyu-bum Han, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 147 days.

(21) Appl. No.: 13/867,563

(22) Filed: Apr. 22, 2013

(65) Prior Publication Data

US 2014/0035495 A1    Feb. 6, 2014

(30) Foreign Application Priority Data

Jul. 31, 2012    (KR) ......................... 10-2012-0084191

(51) Int. Cl.
*H02P 6/00* (2006.01)
*H02P 27/08* (2006.01)
(Continued)

(52) U.S. Cl.
CPC .............. *H02P 27/085* (2013.01); *H02P 21/12* (2013.01); *H02P 27/12* (2013.01)

(58) Field of Classification Search
USPC ............ 318/400.01, 400.02, 400.12, 400.26, 318/721, 798
See application file for complete search history.

(56) References Cited

U.S. PATENT DOCUMENTS

| | | | |
|---|---|---|---|
| 2006/0055363 A1* | 3/2006 | Patel et al. | 318/757 |
| 2008/0191656 A1* | 8/2008 | Satake et al. | 318/722 |
| 2008/0297097 A1* | 12/2008 | Lee et al. | 318/701 |

(Continued)

FOREIGN PATENT DOCUMENTS

| | | |
|---|---|---|
| JP | 2003-348897 A | 12/2003 |
| JP | 2008-068666 A | 3/2008 |

(Continued)

OTHER PUBLICATIONS

Bae, Bon-Ho et al. "New Field Weakening Technique for High Saliency Interior Permanent Magnet Motor". IEEE, pp. 898-905, 2003.

*Primary Examiner* — Paul Ip
*Assistant Examiner* — Bickey Dhakal
(74) *Attorney, Agent, or Firm* — Harness, Dickey & Pierce, PLC (57) ABSTRACT

A method of obtaining a maximum magnetic flux of a permanent magnet synchronous motor may comprise: receiving a first command voltage from a current controller to control current applied to the permanent magnet synchronous motor; receiving an on/off duty ratio of a control pulse signal to control an output voltage of an inverter that drives the permanent magnet synchronous motor, the on/off duty ratio being determined based on the first command voltage; generating a second command voltage corresponding to the output voltage to be output from the inverter based on the on/off duty ratio of the control pulse signal; obtaining a maximum command voltage error by comparing the first and second command voltages; and/or obtaining the maximum command magnetic flux of the permanent magnet synchronous motor according to a position of a rotor of the permanent magnet synchronous motor based on the maximum command voltage error.

15 Claims, 6 Drawing Sheets

(51) Int. Cl.
  *H02P 27/12*  (2006.01)
  *H02P 21/12*  (2006.01)

(56) References Cited

U.S. PATENT DOCUMENTS

| 2009/0167224 | A1 | 7/2009 | Miura et al. | |
|---|---|---|---|---|
| 2009/0256518 | A1 | 10/2009 | Kitanaka et al. | |
| 2011/0031909 | A1 | 2/2011 | Ohgushi | |
| 2011/0101897 | A1* | 5/2011 | Wei et al. | 318/400.3 |
| 2012/0081065 | A1* | 4/2012 | Krafka et al. | 318/798 |

FOREIGN PATENT DOCUMENTS

| JP | 2011-072190 A | 4/2011 |
|---|---|---|
| JP | 2011-176950 A | 9/2011 |
| JP | 2012-019626 A | 1/2012 |
| JP | 2012-029559 A | 2/2012 |
| KR | 10-0435243 B1 | 3/2002 |
| KR | 10-0729300 B1 | 2/2003 |
| KR | 20030010480 A | 2/2003 |
| KR | 10-0747941 B1 | 3/2004 |
| KR | 20050083958 A | 8/2005 |
| KR | 20060014541 A | 2/2006 |
| KR | 20060048925 A | 5/2006 |
| KR | 20080099531 A | 11/2008 |
| KR | 10-1027231 B1 | 4/2009 |
| KR | 20090057125 A | 6/2009 |
| KR | 10-1045155 B1 | 6/2010 |
| KR | 20110003659 A | 1/2011 |
| KR | 20110006993 A | 1/2011 |
| KR | 20110030320 A | 3/2011 |
| KR | 20110031094 A | 3/2011 |
| KR | 10-1115384 B1 | 7/2011 |
| KR | 20110075740 A | 7/2011 |
| KR | 20110113549 A | 10/2011 |

\* cited by examiner

METHODS AND APPARATUSES FOR OBTAINING MAXIMUM MAGNETIC FLUX OF PERMANENT MAGNET SYNCHRONOUS MOTORS

CROSS-REFERENCE TO RELATED APPLICATION(S)

This application claims priority from Korean Patent Application No. 10-2012-0084191, filed on Jul. 31, 2012, in the Korean Intellectual Property Office (KIPO), the entire contents of which are incorporated herein by reference.

BACKGROUND

1. Field

Some example embodiments may relate to methods and apparatuses for obtaining maximum command magnetic flux of permanent magnet synchronous motors, used in controlling high-speed operation of the permanent magnet synchronous motors by using vector control in the permanent magnet synchronous motors.

2. Description of Related Art

Permanent magnet synchronous motors are widely used in various fields, such as electric vehicles, industrial equipment, and consumer electronics, due to their advantages of high efficiency and durability. With the development of various control techniques, performance of a permanent magnet synchronous motor has been improved and thus high-speed operation of the permanent magnet synchronous motor is made possible. During the high-speed operation of a permanent magnet synchronous motor, control of the permanent magnet synchronous motor may become unstable due to a change in the speed of the permanent magnet synchronous motor, a change in the surrounding temperature, and/or a change in parameters such as a voltage, current, and a frequency supplied to the permanent magnet synchronous motor. Thus, a control method of the permanent magnet synchronous motor that may stably generate the maximum torque regardless of changes in the speed of the permanent magnet synchronous motor, the surrounding temperature, and/or the parameters of the permanent magnet synchronous motor during the high-speed operation of the permanent magnet synchronous motor is required.

SUMMARY

Some example embodiments may provide methods and apparatuses for obtaining maximum command magnetic flux of permanent magnet synchronous motors.

Some example embodiments may provide computer-readable recording mediums having recorded thereon programs for executing the methods on computers.

In some example embodiments, a method of obtaining a maximum magnetic flux of a permanent magnet synchronous motor may comprise: receiving a first command voltage from a current controller to control current applied to the permanent magnet synchronous motor; receiving an on/off duty ratio of a control pulse signal to control an output voltage of an inverter that drives the permanent magnet synchronous motor, the on/off duty ratio being determined based on the first command voltage; generating a second command voltage corresponding to the output voltage to be output from the inverter based on the on/off duty ratio of the control pulse signal; obtaining a maximum command voltage error by comparing the first and second command voltages; and/or obtaining the maximum command magnetic flux of the permanent magnet synchronous motor according to a position of a rotor of the permanent magnet synchronous motor based on the maximum command voltage error.

In some example embodiments, the method may further comprise calculating in real time a maximum output voltage of the inverter according to the position of the rotor. The maximum output voltage may be located on a perimeter of a hexagonal space vector diagram indicating the output voltage of the inverter, based on the position of the rotor and a direct current (DC)-link voltage of the inverter.

In some example embodiments, the maximum output voltage may be calculated by an equation, $$V_{max\_hexa} = \frac{2 \cdot v_{dc}}{\sqrt{3} \cdot \sin\theta_{r\_rem} + 3 \cdot \sin\theta_{r\_rem}}$$

wherein $V_{max\_hexa}$ denotes the maximum output voltage of the inverter according to the position of the rotor, $v_{dc}$ denotes the DC-link voltage of the inverter, and $\theta_{r\_rem}$ denotes a remainder when the position of the rotor is divided by 60°.

In some example embodiments, in the obtaining of the maximum command magnetic flux, the maximum command magnetic flux may be obtained based on the maximum output voltage and the maximum command voltage error.

In some example embodiments, in the obtaining of the maximum command voltage error, the maximum command voltage error may be obtained by using a proportional-integral controller having an anti-windup function.

In some example embodiments, the obtaining of the maximum command magnetic flux may comprise obtaining a maximum command voltage by summing the maximum output voltage and the maximum command voltage error; and/or obtaining the maximum command magnetic flux by dividing the maximum command voltage by a speed of the rotor.

In some example embodiments a magnetic flux controller for obtaining a maximum magnetic flux of a permanent magnet synchronous motor may comprise: a command voltage generation unit configured to generate a second command voltage corresponding to an output voltage to be output from an inverter based on an on/off duty ratio of a control pulse signal to control the output voltage of the inverter that drives the permanent magnet synchronous motor; a command voltage error obtaining unit configured to obtain a maximum command voltage error by comparing the second command voltage and a first command voltage input from a current controller to control current applied to the permanent magnet synchronous motor; and/or a command magnetic flux obtaining unit configured to obtain the maximum command magnetic flux of the permanent magnet synchronous motor according to a position of a rotor of the permanent magnet synchronous motor based on the maximum command voltage error.

In some example embodiments, the magnetic flux controller may further comprise an inverter output voltage calculation unit configured to calculate a maximum output voltage of the inverter according to the position of the rotor. The inverter output voltage calculation unit may be further configured to calculate in real time the maximum output voltage located on a perimeter of a hexagonal space vector diagram indicating the output voltage of the inverter, based on the position of the rotor and a direct current (DC)-link voltage of the inverter.

In some example embodiments, the inverter output voltage calculation unit may be further configured to calculate the maximum output voltage by an equation, $$V_{max\_hexa} = \frac{2 \cdot v_{dc}}{\sqrt{3} \cdot \sin\theta_{r\_rem} + 3 \cdot \sin\theta_{r\_rem}}$$

wherein $V_{max\_hexa}$ denotes the maximum output voltage of the inverter according to the position of the rotor, $v_{dc}$ denotes the DC-link voltage of the inverter, and $\theta_{r\_rem}$ denotes a remainder when the position of the rotor is divided by 60°.

In some example embodiments, the command magnetic flux obtaining unit may be further configured to obtain the maximum command magnetic flux of the permanent magnet synchronous motor according to the position of the rotor, based on the maximum output voltage and the maximum command voltage error.

In some example embodiments, the command voltage error obtaining unit may be further configured to obtain the maximum command voltage error by using a proportional-integral controller having an anti-windup function.

In some example embodiments, the command magnetic flux obtaining unit may be further configured to obtain a maximum command voltage by summing the maximum output voltage and the maximum command voltage error, and/or may be further configured to obtain the maximum command magnetic flux by dividing the maximum command voltage by a speed of the rotor.

In some example embodiments, a method of controlling driving of a permanent magnet synchronous motor may comprise: receiving a maximum command magnetic flux of the permanent magnet synchronous motor according to a position of a rotor of the permanent magnet synchronous motor; obtaining a torque limit value corresponding to the maximum command magnetic flux by using a first lookup table; obtaining a second command torque in which a torque value of a first command torque input to control the driving of the permanent magnet synchronous motor may be limited according to the torque limit value; generating a first command voltage based on a command current obtained based on the second command torque and a current detected in the permanent magnet synchronous motor; determining an on/off duty ratio of a control pulse signal to control an output voltage of an inverter that drives the permanent magnet synchronous motor, based on the first command voltage; and/or converting input power to the output voltage of the inverter according to the on/off duty ratio of the control pulse signal and outputting the output voltage to the permanent magnet synchronous motor.

In some example embodiments, the command current may be obtained based on a speed of the rotor and the second command torque by using a second lookup table.

In some example embodiments, in the generating of the first command voltage, the first command voltage may be further generated based on a speed of the rotor.

In some example embodiments, the maximum command magnetic flux may be obtained based on a speed of the rotor, the first command voltage, and the on/off duty ratio of the control pulse signal.

In some example embodiments, the maximum command magnetic flux may be obtained by further referring to a maximum output voltage of the inverter according to the position of the rotor, and/or the maximum output voltage may be located on a perimeter of a hexagonal space vector diagram indicating the output voltage of the inverter and may be calculated in real time based on the position of the rotor and a direct current (DC)-link voltage of the inverter.

In some example embodiments, a computer readable recording medium may have recorded thereon a program for executing the method described above.

In some example embodiments, an apparatus for controlling driving of a permanent magnet synchronous motor may comprise: a torque limiting unit configured to obtain a torque limit value corresponding to a maximum command magnetic flux of the permanent magnet synchronous motor according to a position of a rotor of the permanent magnet synchronous motor by using a first lookup table, and configured to obtain a second command torque by limiting a torque value of a first command torque input to control the driving of the permanent magnet synchronous motor according to the torque limit value; a command current obtaining unit configured to obtain a command current based on a speed of the rotor and the second command torque by using a second lookup table; a current controller configured to generate a first command voltage based on the command current, a current detected in the permanent magnet synchronous motor, and the speed of the rotor; and/or a pulse width modulation control unit configured to determine an on/off duty ratio of a control pulse signal to control an output voltage of an inverter that drives the permanent magnet synchronous motor, based on the first command voltage. The inverter may be configured to convert input power to the output voltage according to the on/off duty ratio of the control pulse signal and/or may be configured to output the output voltage to the permanent magnet synchronous motor.

In some example embodiments, the apparatus may further comprise a magnetic flux controller configured to obtain a maximum command voltage error by comparing the first command voltage and a second command voltage generated based on the on/off duty ratio of the control pulse signal and corresponding to the output voltage of the inverter, configured to obtain a maximum command voltage by summing the maximum command voltage error and a maximum output voltage of the inverter according to the position of the rotor, and/or configured to obtain the maximum command magnetic flux by dividing the maximum command voltage by the speed of the rotor. The magnetic flux controller may be further configured to calculate in real time the maximum output voltage located on a perimeter of a hexagonal space vector diagram indicating the output voltage of the inverter, based on the position of the rotor and a direct current (DC)-link voltage of the inverter.

In some example embodiments, the command magnetic flux obtaining unit may be further configured to output the maximum command magnetic flux based on a speed of the rotor of the permanent magnet synchronous motor.

In some example embodiments, the magnetic flux controller may further comprise an inverter output voltage calculation unit configured to receive the position of the rotor of the permanent magnet synchronous motor, and/or configured to output a maximum output voltage of the inverter based on the position of the rotor of the permanent magnet synchronous motor.

In some example embodiments, the command voltage generation unit may be further configured to receive a direct current (DC)-link voltage of the inverter. The command voltage generation unit may be further configured to output the second command voltage based on the on/off duty ratio of the control pulse signal and the DC-link voltage of the inverter.

In some example embodiments, the magnetic flux controller may further comprise an inverter output voltage calculation unit configured to receive the position of the rotor of the permanent magnet synchronous motor and the DC-link voltage of the inverter, and/or configured to output a maximum output voltage of the inverter based on the position of the rotor of the permanent magnet synchronous motor and the DC-link voltage of the inverter.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
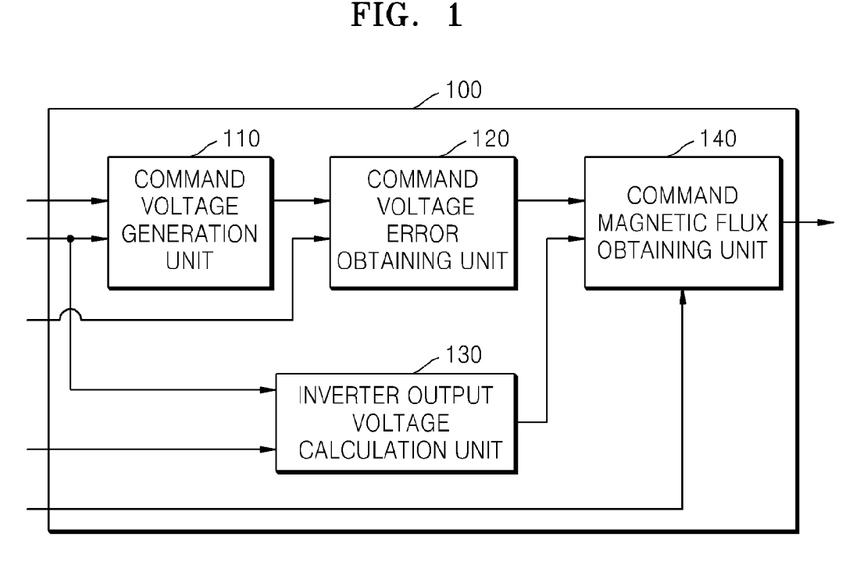
FIG. 1 is a block diagram illustrating a magnetic flux controller according to some example embodiments.

FIG. 1 is a block diagram illustrating a magnetic flux controller 100 according to some example embodiments. Referring to FIG. 1, the magnetic flux controller 100 includes a command voltage generation unit 110, a command voltage error obtaining unit 120, an inverter output voltage calculation unit 130, and a command magnetic flux obtaining unit 140.

In FIG. 1, the magnetic flux controller 100 is illustrated to include only constituent elements related to some example embodiments to prevent misunderstanding of the associated technical features. Thus, those of ordinary skill in the art may easily understand that the magnetic flux controller 100 may further include general constituent elements other than the constituent elements illustrated in FIG. 1.

The magnetic flux controller 100 according to some example embodiments may correspond to at least one processor or may include at least one processor. Accordingly, the magnetic flux controller 100 may be included in other hardware equipment such as a control apparatus or a general computer system to be driven therein.

A permanent magnet synchronous motor (PMSM) generates a magnetic flux by using a permanent magnet located at a rotor (not shown) of a motor and is rotated as current flows in a stator due to the generated magnetic flux. The PMSM according to some example embodiments may be an interior permanent magnet synchronous motor (IPMSM), but example embodiments are not limited thereto.

The magnetic flux controller 100 obtains a maximum command magnetic flux of a PMSM (not shown) according to the position of the rotor of the PMSM and outputs the obtained maximum command magnetic flux to a control apparatus (not shown) for controlling driving of the PMSM. Accordingly, a maximum possible torque in the PMSM may be generated during a high-speed rotation of the PMSM.

In order to obtain the maximum command magnetic flux of the PMSM according to the position of the rotor of the PMSM, the magnetic flux controller 100 uses the speed and position of the rotor detected in the PMSM, a direct current (DC)-link voltage of an inverter (not shown), and an on/off duty ratio of a control pulse signal and a first command voltage obtained by a control apparatus (not shown).

The maximum command magnetic flux varies according to the position of the rotor of the PMSM, and the magnetic flux controller 100 obtains the maximum command magnetic flux as the position of the rotor of the PMSM varies. The control apparatus generates the first command voltage based on an input command torque, a current detected in the PMSM, the speed and position of the rotor, and the maximum command magnetic flux according to the present position of the rotor, and determines the on/off duty ratio of the control pulse signal based on the generated first command voltage. The output voltage of the inverter supplied to the PMSM is generated according to the control pulse signal determined based on the first voltage command of the control apparatus.

Thus, the magnetic flux controller 100 receives as inputs the speed and position of the rotor detected in the PMSM, the DC-link voltage of the inverter, and the on/off duty ratio of the control pulse signal and the first command voltage obtained by the control apparatus.

The command voltage generation unit 110 generates a second command voltage based on the on/off duty ratio of the control pulse signal that controls an output voltage of the inverter for driving the PMSM. The second command voltage corresponds to the output voltage to be output from the inverter. Although the on/off duty ratio of the control pulse signal is a value determined according to the first command voltage generated by a current controller (not shown) for controlling current applied to the PMSM, the second command voltage does not match the first command voltage due to an error in an operation process.

Accordingly, the command voltage generation unit 110 outputs the second command voltage to the command voltage error obtaining unit 120 to obtain a maximum command voltage error between the first and second command voltages. The command voltage error obtaining unit 120 obtains the maximum command voltage error by comparing the first and second command voltages.

The first command voltage is generated by the current controller and the second command voltage corresponds to an actual output voltage of the inverter. Thus, the magnetic flux controller 100 may correct an error between the first and second command voltages by comparing the first and second command voltages, obtaining the maximum command voltage error, and reflecting the maximum command voltage error in obtaining the maximum command magnetic flux. Accordingly, the magnetic flux controller 100 may improve an output of the PMSM.

According to some example embodiments, the command voltage error obtaining unit 120 obtains the maximum command voltage error by using a proportional-integral controller (PI controller) having an anti-windup function. The PI controller, which is in the form of a feedback controller, calculates an error value by comparing a target value to be controlled with a reference value used as a standard, by using a proportional term and an integral term, and calculates a control value needed for control by using a calculated error value.

For example, the second command voltage corresponding to an actual output voltage of the inverter may be a target value, whereas the first command voltage generated by the current controller may be a reference value.

When the PI controller controls a command error between the first and second command voltages, integral values of the error may be overly accumulated resulting in integral windup occurring that makes the control ineffective. The PI controller may include an anti-windup function to prevent the integral windup.

The inverter output voltage calculation unit 130 calculates the maximum output voltage of the inverter according to the position of the rotor based on the DC-link voltage of the inverter and the position of the rotor. When an output voltage that may be generated by the inverter is indicated by a space vector in a complex number space, the output voltage is represented as a hexagonal space vector diagram. The maximum output voltage of the inverter is located on a perimeter of the hexagonal space vector diagram.

The magnetic flux controller 100 according to some example embodiments calculates the maximum output voltage of the inverter as a voltage located on a perimeter of the hexagonal space vector diagram, that is, a voltage that varies in real time according to the position of the rotor, not a voltage that remains constant regardless of the position of the rotor located on an inscribed circle of the hexagonal space vector diagram. Accordingly, the magnetic flux controller 100 may obtain the maximum output voltage of the PMSM and control driving of the PMSM based on the obtained maximum command magnetic flux, thereby enabling the PMSM to generate the maximum possible torque.

The command magnetic flux obtaining unit 140 obtains the maximum command magnetic flux of the PMSM according to the position of the rotor of the PMSM based on the maximum command voltage error. The command magnetic flux obtaining unit 140 may obtain the maximum command magnetic flux of the PMSM according to the position of the rotor further based on the maximum output voltage calculated by the inverter output voltage calculation unit 130. The command magnetic flux obtaining unit 140 obtains a maximum command voltage by summing the maximum output voltage and the maximum command voltage error, and obtains the maximum command magnetic flux by dividing the maximum command voltage by the speed of the rotor.

Figure 2:
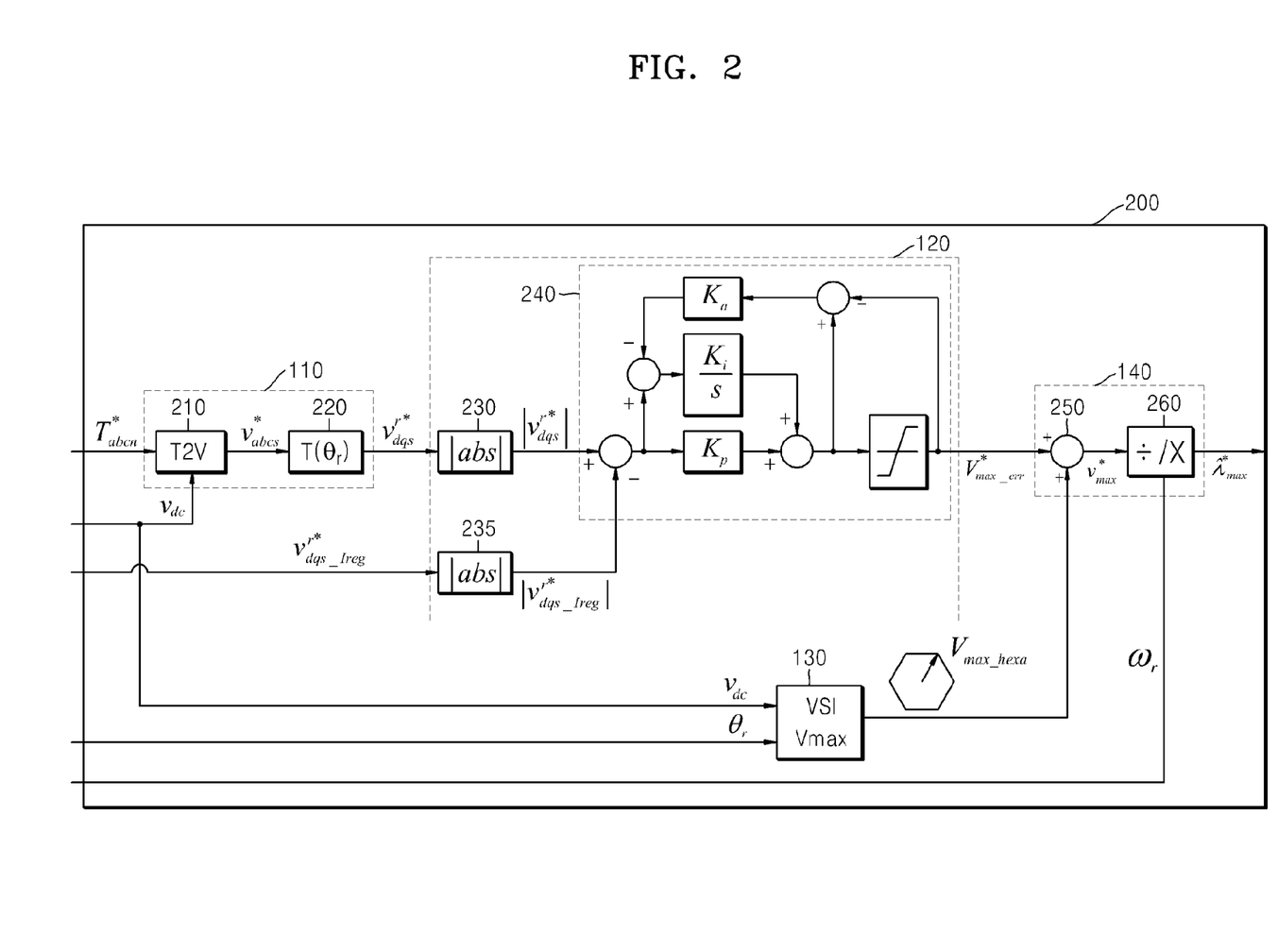
FIG. 2 is a block diagram illustrating a magnetic flux controller according to some example embodiments.

FIG. 2 is a block diagram illustrating a magnetic flux controller 200 according to some example embodiments. Referring to FIG. 2, the magnetic flux controller 200 includes the command voltage generation unit 110, the command voltage error obtaining unit 120, the inverter output voltage calculation unit 130, and the command magnetic flux obtaining unit 140.

The magnetic flux controller 100 of FIG. 1 may further include general constituent elements other than the constituent elements illustrated in FIG. 2. Since the description in relation to the magnetic flux controller 100 of FIG. 1 may be applied to the magnetic flux controller 200 of FIG. 2, it will not be repeated here.

The magnetic flux controller 200 according to some example embodiments may correspond to at least one processor or may include at least one processor. Accordingly, the magnetic flux controller 200 may be driven by being included in other hardware equipment such as a control apparatus or a general computer system.

The magnetic flux controller 200 obtains a maximum command magnetic flux of the PMSM according to the position of the rotor and outputs the obtained maximum command magnetic flux to the control apparatus for controlling driving of the PMSM. Accordingly, the maximum possible torque in the PMSM may be generated during high-speed rotation of the PMSM.

The magnetic flux controller 200 obtains the maximum command magnetic flux of the PMSM according to the position of the rotor of the PMSM by using the speed and position of the rotor detected in the PMSM, the DC-link voltage of the inverter, and the on/off duty ratio of the control pulse signal and the first command voltage obtained by the control apparatus.

The maximum command magnetic flux varies according to the position of the rotor of the PMSM, and the magnetic flux controller 200 obtains the maximum command magnetic flux as the position of the rotor of the PMSM varies. The control apparatus generates the first command voltage based on an input command torque, current detected in the PMSM, the speed and position of the rotor, and the maximum command magnetic flux according to the present position of the rotor, and determines the on/off duty ratio of the control pulse signal based on the generated first command voltage. The output voltage of the inverter supplied to the PMSM is generated according to the control pulse signal determined based on the first voltage command of the control apparatus.

The inverter according to some example embodiments is a pulse width modulation (PWM) inverter and may be driven by a PWM method. Accordingly, the amplitude and frequency of the output voltage output from the inverter are controlled by using the on/off duty ratio of the control pulse signal. For example, the control apparatus controls the output voltage output by the inverter by adjusting the on/off duty ratio of the control pulse signal for turning on/off a switching element of the inverter. The control pulse signal may be referred to as a gating signal. The control apparatus may use space vector modulation which is an algorithm for the control of PWM.

The output voltage of the inverter is a three-phase voltage and the PMSM is driven by a three-phase output voltage. A vector control method is a method to generate the three-phase output voltage in order to control an electric motor. The vector control method is used to generate the three-phase output voltage for controlling the driving of the PMSM. Three-phase parameters indicated by phases a, b, and c of the PMSM may be represented by being converted to a d-q axis model that is a rectangular coordinate system.

The magnetic flux controller 200 receives the speed $\omega_r$ and position $\theta_r$ of the rotor detected in the PMSM, the DC-link voltage $v_{dc}$ of the inverter, the first command voltage $v_{dqs\_Ireg}^{r*}$ obtained by the control apparatus, and the on/off duty ratio $T^*_{abcn}$ of the control pulse signal. The first command voltage $v_{dqs\_Ireg}^{r*}$ is an abbreviated representation of $v_{ds\_Ireg}^{r*}$ and $v_{qs\_Ireg}^{r*}$.

The command voltage generation unit 110 generates the second command voltage $v_{dqs}^{r*}$ based on the on/off duty ratio $T^*_{abcn}$ of the control pulse signal that controls the output voltage of the inverter. Since the on/off duty ratio $T^*_{abcn}$ of the control pulse signal corresponds to a three-phase parameter, the second command voltage $v_{dqs}^{r*}$ is generated by transforming a command phase voltage $v^*_{abcs}$, generated from the on/off duty ratio $T^*_{abcn}$ of the control pulse signal, into a direct-quadrature (d-q) axis model. The command phase voltage $v^*_{abcs}$ is an abbreviated representation of three-phase command phase voltages $v^*_{as}$, $v^*_{bs}$, and $v^*_{cs}$.

The command voltage generation unit 110 includes a command phase voltage generation unit 210 for generating a command phase voltage from the on/off duty ratio of a pulse signal and a coordinate transformation unit 220 for transforming the command phase voltage to the d-q axis model.

The command phase voltage generation unit 210 generates the command phase voltage $v^*_{abcs}$ generated from the on/off duty ratio $T^*_{abcn}$ of the control pulse signal. The command phase voltage $v^*_{abcs}$ may be calculated by using Equation 1.

$$\begin{bmatrix} v^*_{as} \\ v^*_{bs} \\ v^*_{cs} \end{bmatrix} = \frac{v_{dc}}{3 \cdot T_s} \begin{bmatrix} 2 & -1 & -1 \\ -1 & 2 & -1 \\ -1 & -1 & 2 \end{bmatrix} \begin{bmatrix} T^*_{an} \\ T^*_{bn} \\ T^*_{cn} \end{bmatrix} \quad \text{[Equation 1]}$$

In Equation 1, $v^*_{as}$, $v^*_{bs}$, and $v^*_{cs}$ denote three-phase command phase voltages, $T^*_{an}$, $T^*_{bn}$, and $T^*_{cn}$ denote the on/off duty ratios of the respective phases of the control pulse signal. Also, $v_{dc}$ denotes the DC-link voltage of the inverter and $T_s$ denotes a cycle of the control pulse signal of the inverter. As in Equation 1, the three-phase command phase voltages, $v^*_{as}$, $v^*_{bs}$, and $v^*_{cs}$ may be calculated from the on/off duty ratios $T^*_{an}$, $T^*_{bn}$, and $T^*_{cn}$ of the control pulse signal of the respective three phases by using the DC-link voltage $v_{dc}$ of the inverter and the cycle $T_s$ of the control pulse signal of the inverter.

The coordinate transformation unit 220 transforms the command phase voltage $v^*_{abcs}$ to a d-q axis model. The d-q axis model is obtained by transforming parameters of a motor expressed by three phases of a, b, and c to values of a rectangular coordinate system formed of d, q, and n axes. The d-q axis model is classified into a stationary coordinate system and a rotating coordinate system depending on the rotation of the axis. The coordinate transformation unit 220 generates the second command voltage $v^*_{dqs}$ that is a command voltage of a rotating coordinate system by transforming the command phase voltage $v^*_{abcs}$. The coordinate transformation is calculated by using Equation 2.

$$\begin{bmatrix} v^{r*}_{ds} \\ v^{r*}_{qs} \end{bmatrix} = \begin{bmatrix} \cos\theta_r & \frac{1}{\sqrt{3}}\sin\theta_r & -\frac{1}{\sqrt{3}}\sin\theta_r \\ -\sin\theta_r & \frac{1}{\sqrt{3}}\cos\theta_r & -\frac{1}{\sqrt{3}}\cos\theta_r \end{bmatrix} \begin{bmatrix} v^*_{as} \\ v^*_{bs} \\ v^*_{cs} \end{bmatrix} \quad \text{[Equation 2]}$$

In Equation 2, $v_{ds}^{r*}$ and $v_{qs}^{r*}$ denote command voltages of a rotating coordinate system indicated by a d-q axis model and $v^*_{as}$, $v^*_{bs}$, and $v^*_{cs}$ denote command phase voltages of the three phases. Also, $\theta_r$ denotes the position of the rotor. Accordingly, the coordinate transformation unit 220 transforms the three-phase command phase voltages $v^*_{as}$, $v^*_{bs}$, and $v^*_{cs}$ to the command voltages $v_{ds}^{r*}$ and $v_{qs}^{r*}$ of the rotating coordinate system referring to the position $\theta_r$ of the rotor, as in Equation 2.

The command voltage error obtaining unit 120 obtains the maximum command voltage error $V^*_{max\_err}$ by comparing the first command voltage $v_{dqs\_Ireg}^{r*}$ input by the current controller for controlling current applied to the PMSM and the second command voltage $v_{dqs}^{r*}$ generated by the command voltage generation unit 110.

The command voltage error obtaining unit 120 may include a first calculation unit 235 for calculating the magnitude of a vector of the first command voltage, a second calculation unit 230 for calculating the magnitude of a vector of the second command voltage, and a PI controller 240 for obtaining the maximum command voltage error by comparing a vector magnitude between the first and second command voltages.

The first calculation unit 235 calculates a vector magnitude $|v_{dqs\_Ireg}^{r*}|$ of the first command voltage $v_{dqs\_Ireg}^{r*}$. The first calculation unit 235 may obtain the vector magnitude of the first command voltage through the calculation of Equation 3.

$$|v_{dqs\_Ireg}^{r*}| = \sqrt{v_{ds\_Ireg}^{r*}{}^2 + v_{qs\_Ireg}^{r*}{}^2} \qquad \text{[Equation 3]}$$

The second calculation unit 230 calculates a vector magnitude $|v_{dqs}^{r*}|$ of the second command voltage $v_{dqs}^{r*}$. The second calculation unit 230 may obtain the vector magnitude of the second command voltage through the calculation of Equation 4.

$$|v_{dqs}^{r*}| = \sqrt{v_{ds}^{r*}{}^2 + v_{qs}^{r*}{}^2} \qquad \text{[Equation 4]}$$

The PI controller 240 includes an anti-windup term $K_a$ and obtains the maximum command voltage error $V^*_{max\_err}$ by comparing the vector magnitude $|v_{dqs\_Ireg}^{r*}|$ of the first command voltage and the vector magnitude $|v_{dqs}^{r*}|$ of the second command voltage by using the integral term $K_i/s$ and the proportional term $K_p$.

The calculation of the PI controller 240 may be expressed by Equation 5.

$$V^*_{max\_err} = PI \cdot (|v_{dqs}^{r*}| - |v_{dqs\_Ireg}^{r*}|) \qquad \text{[Equation 5]}$$

In Equation 5, $V^*_{max\_err}$ denotes the maximum command voltage error and PI denotes the calculation of the PI controller 240. $|v_{dqs\_Ireg}^{r*}|$ and $|v_{dqs}^{r*}|$ denote the vector magnitude of the first command voltage and the vector magnitude of the second command voltage, respectively.

Accordingly, the PI controller 240 may obtain the maximum command voltage error, thereby enabling the magnetic flux controller 200 to correct an error between the first and second command voltages by reflecting the maximum command voltage error in obtaining the maximum command magnetic flux.

Thus, the command voltage generation unit 110 outputs the second command voltage to the command voltage error obtaining unit 120 to obtain the maximum command voltage error between the first and second command voltages.

The inverter output voltage calculation unit 130 calculates a maximum output voltage $V_{max\_hexa}$ of the inverter according to the position of the rotor based on the position $\theta_r$ of the rotor and the DC-link voltage $v_{dc}$ of the inverter. The maximum output voltage $V_{max\_hexa}$ of the inverter is located on a perimeter of the hexagonal space vector diagram indicating the output voltage of the inverter.

The inverter output voltage calculation unit 130 may calculate the maximum output voltage of the inverter according to the position of the rotor by using Equation 6.

$$V_{max\_hexa} = \frac{2 \cdot v_{dc}}{\sqrt{3} \cdot \sin\theta_{r\_rem} + 3 \cdot \sin\theta_{r\_rem}}, \qquad \text{[Equation 6]}$$

where $$\theta_{r\_rem} = rem(\theta_r, 60°)$$

In Equation 6, $V_{max\_hexa}$ denotes the maximum output voltage of the inverter according to the position of the rotor. $v_{dc}$ denotes the DC-link voltage of the inverter. $\theta_r$ denotes the position of the rotor. $\theta_{r\_rem}$ denotes the remainder when the position of the rotor is divided by 60°.

The hexagonal space vector diagram may be divided by 60° with respect to the center point into six triangles that are each the same size. Since the maximum output voltage $V_{max\_hexa}$ of the inverter according to the position of the rotor is located on the perimeter of the hexagonal space vector diagram, the maximum output voltage $V_{max\_hexa}$ of the inverter according to the position of the rotor is repeated at every 60°. Thus, the maximum output voltage $V_{max\_hexa}$ of the inverter according to the position of the rotor may be calculated by using $\theta_{r\_rem}$ instead of the position of the rotor $\theta_r$.

The magnetic flux controller 200 according to some example embodiments calculates the maximum output voltage of the inverter as a voltage that varies in real time according to the position of the rotor located on the perimeter of the hexagonal space vector diagram, not a voltage that remains constant regardless of the position of the rotor located on the inscribed circle of the hexagonal space vector diagram.

Accordingly, the magnetic flux controller 200 may obtain the maximum possible output voltage in the PMSM and may control the driving of the PMSM based on the obtained maximum command magnetic flux to allow the PMSM to generate the maximum possible torque.

The command magnetic flux obtaining unit 140 obtains a maximum command magnetic flux $\lambda^*_{max}$ of the PMSM according to the position of the rotor based on the maximum command voltage error $V^*_{max\_err}$ and the maximum output voltage $V_{max\_hexa}$ calculated by the inverter output voltage calculation unit 130.

The command magnetic flux obtaining unit 140 includes a third calculation unit 250 for summing the maximum output voltage and the maximum command voltage error and a fourth calculation unit 260 for dividing the maximum command voltage by the speed of the rotor.

The third calculation unit 250 obtains the maximum command voltage $V^*_{max}$ by summing the maximum output voltage $V_{max\_hexa}$ and the maximum command voltage error $V^*_{max\_err}$ as in Equation 7.

$$V^*_{max} = V_{max\_hexa} + V^*_{max\_err} \qquad \text{[Equation 7]}$$

The fourth calculation unit 260 obtains the maximum command magnetic flux $\lambda^*_{max}$ by dividing the maximum command voltage $V^*_{max}$ by the speed $\omega_r$ of the rotor as in Equation 8.

$$\lambda^*_{max} = \frac{V^*_{max}}{\omega_r} \qquad \text{[Equation 8]}$$

As described above, the magnetic flux controller 200 may obtain in real time the maximum command magnetic flux of the PMSM according to the position of the rotor. The magnetic flux controller 200 outputs the obtained maximum command magnetic flux to the control apparatus for controlling the driving of the PMSM so that the maximum possible torque may be generated in the PMSM during high-speed rotation of the PMSM.

Figure 3:
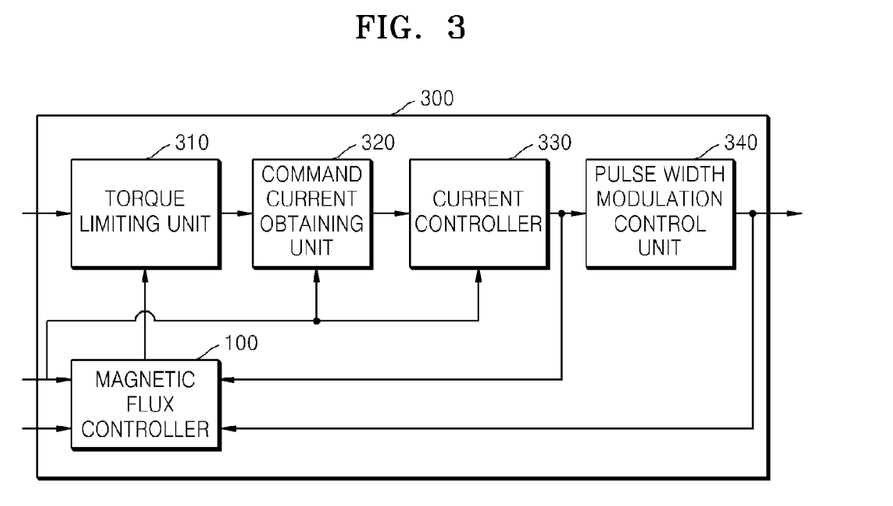
FIG. 3 is a block diagram illustrating a control apparatus including the magnetic flux controller of FIG. 1 according to some example embodiments.

FIG. 3 is a block diagram illustrating a control apparatus 300 according to some example embodiments. Referring to FIG. 3, the control apparatus 300 includes a torque limiting unit 310, a command current obtaining unit 320, a current controller 330, a pulse width modulation control unit 340, and the magnetic flux controller 100.

In FIG. 3, the control apparatus 300 is illustrated to include only constituent elements related to some example embodiments to prevent misunderstanding of the associated technical features. Thus, those of ordinary skill in the art may easily understand that the control apparatus 300 may further include general constituent elements other than the constituent elements illustrated in FIG. 3.

The control apparatus 300 according to some example embodiments may correspond to at least one processor or may include at least one processor. Accordingly, the control apparatus 300 may be included in other hardware equipment such as a general computer system to be driven therein.

Since the descriptions related to the magnetic flux controller 100 and 200 in FIGS. 1 and 2 may be applied to the magnetic flux controller 100 of FIG. 3, redundant descriptions will be omitted herein.

The control apparatus 300 according to some example embodiments generates a control pulse signal to control the output voltage of the inverter and outputs the generated control pulse signal to the inverter. The inverter generates an output voltage by converting input power according to the on/off duty ratio of the control pulse signal. The inverter outputs the generated output voltage to the PMSM and the PMSM is driven by the output voltage of the inverter.

The control apparatus 300 generates the control pulse signal to control the output voltage of the inverter based on a first command torque that is input to control driving of the PMSM. The control apparatus 300 corrects an error in the output voltage of the inverter through adjustment of the on/off duty ratio of the control pulse signal by reflecting the current and the speed and position of the rotor detected in the PMSM that is being driven in the on/off duty ratio of the control pulse signal.

The torque limiting unit 310 receives a maximum command magnetic flux of the PMSM from the magnetic flux controller 100, and obtains a torque limit value corresponding to the maximum command magnetic flux by using a first lookup table. The torque limiting unit 310 obtains a second command torque by limiting a torque value of the first command torque input to control the driving of the PMSM according to the torque limit value.

A lookup table (LUT) is a data structure in which result values corresponding to input values are listed as an array or an associative array. The lookup table has result values of calculation of the input values or has experimentally obtained data as result values. For example, the torque limiting unit 310 obtains a torque limit value corresponding to the maximum command magnetic flux input to the torque limiting unit 310 by referring to the first lookup table, and limits a torque value of the input first command torque according to the obtained torque limit value. Accordingly, the torque limiting unit 310 outputs the second command torque having a limited torque value based on the maximum command magnetic flux.

The command current obtaining unit 320 receives the second command torque from the torque limiting unit 310 and obtains the speed of the rotor by using the second lookup table and a command current based on the second command torque. The second lookup table, like the first lookup table, may have the result values of calculation of the input values or may have the experimentally obtained data as the result values. The second lookup table stores command current values according to the speed of the rotor of the PMSM and the torque value of the second command torque. The command current obtaining unit 320, referring to the second lookup table, outputs a command current corresponding to the torque value of the second command torque having a limited torque value according to the speed of the rotor of the PMSM and the maximum command magnetic flux that are input to the command current obtaining unit 320.

The current controller 330 generates the first command voltage based on the command current received from the command current obtaining unit 320 and the current and the speed of the rotor detected in the PMSM. The current controller 330 allows a desired current to flow in the PMSM. The current controller 330 generates a first command voltage in which the error between the actual current flowing in the PMSM and the command current is corrected.

The pulse width modulation control unit 340 determines the on/off duty ratio of the control pulse signal to control the output voltage of the inverter driving the PMSM, based on the first command voltage. The pulse width modulation control unit 340 generates the control pulse signal to control a switching device of the inverter so that the inverter may generate the output voltage according to the first command voltage. The control pulse signal is referred to as a gating signal. The pulse width modulation control unit 340 may use a space vector modulation which is an algorithm for the control of PWM.

The pulse width modulation control unit 340 outputs the control pulse signal having the on/off duty ratio determined based on the first command voltage to the inverter. As the switching devices of the inverter are switched according to the determined on/off duty ratio, the inverter outputs the output voltage according to the control pulse signal to the PMSM.

The magnetic flux controller 100 receives the speed and position of the rotor detected in the PMSM, the DC-link voltage of the inverter, and the on/off duty ratio of the control pulse signal and the first command voltage, and obtains the maximum command magnetic flux of the PMSM.

The control apparatus 300 according to some example embodiments obtains in real time the maximum command magnetic flux of the PMSM according to the position of the rotor of the PMSM, based on the maximum command magnetic flux, and thus may stably generate the maximum possible torque in the PMSM regardless of a change in the parameter of the PMSM.

Although FIG. 3 illustrates that the control apparatus 300 includes the magnetic flux controller 100, the magnetic flux controller 100 may be present separately from the control apparatus 300 and thus the control apparatus 300 according to some example embodiments may operate without including the magnetic flux controller 100. Accordingly, the magnetic flux controller 100 may not be a constituent element of the control apparatus 300.

Figure 4:
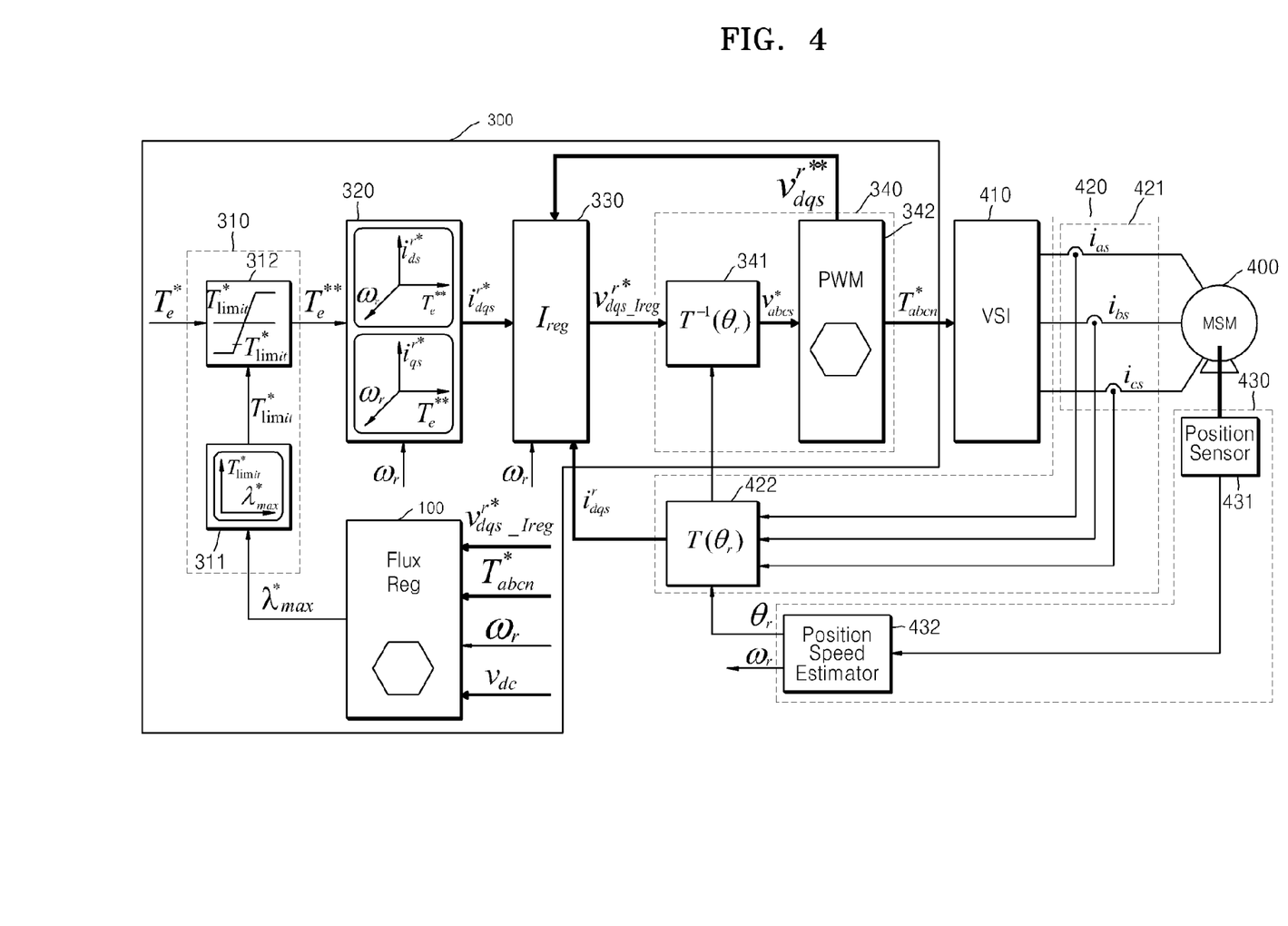
FIG. 4 is a block diagram illustrating a drive system for controlling driving of a permanent magnet synchronous motor by using the control apparatus of FIG. 3.

FIG. 4 is a block diagram illustrating a drive system for controlling driving of the PMSM by using the control apparatus of FIG. 3. Referring to FIG. 4, the drive system includes the control apparatus 300 a PMSM 400, an inverter 410, a current obtaining unit 420, and a rotor speed and position obtaining unit 430. Also, the control apparatus 300 includes the torque limiting unit 310, the command current obtaining unit 320, the current controller 330, the pulse width modulation control unit 340, and the magnetic flux controller 100.

In FIG. 4, the drive system is illustrated to include only constituent elements related to some example embodiments to prevent misunderstanding of the associated technical features. Thus, those of ordinary skill in the art may easily understand that the drive system may further include general constituent elements other than the constituent elements illustrated in FIG. 4.

The PMSM 400 generates a magnetic flux by using a permanent magnet located at a rotor (not shown) and is rotated as current flows in a stator due to the generated magnetic flux, thereby generating a torque to drive a load. The PMSM 400 according to some example embodiments may be an IPMSM, but example embodiments are not limited thereto.

The PMSM 400 is driven by an output voltage output from the inverter 410. In other words, the driving of the PMSM 400 is controlled based on the current detected by the inverter 410 in the PMSM 400 that is being driven, the speed and position of the rotor, and the command torque input to control driving of the PMSM 400.

The inverter 410 converts input power according to an on/off duty ratio $T^*_{abcn}$ of a control pulse signal applied from the control apparatus 300 and generates an output voltage to be applied to the PMSM 400. The inverter 410 may be a voltage source inverter (VSI) or a current source inverter (CSI). In the following description, the inverter 410 is regarded as a voltage source inverter for convenience of explanation.

The inverter 410 according to some example embodiments is a PWM inverter and may be driven by a PWM method. Accordingly, the amplitude and frequency of the output voltage output from the inverter 410 are controlled by using the on/off duty ratio of the control pulse signal. For example, the control apparatus 300 controls the output voltage output by the inverter 410 by adjusting the on/off duty ratio $T^*_{abcn}$ of the control pulse signal that turns the switching device of the inverter 410 on/off. The control pulse signal is referred to as a gating signal. The control apparatus 300 may use space vector modulation which is an algorithm for the control of PWM.

The output voltage of the inverter 410 is a three-phase voltage and the PMSM 400 is driven by a three-phase output voltage. A vector control method is a method to generate the three-phase output voltage in order to control an electric motor. The vector control method is used to generate the three-phase output voltage for controlling the driving of the PMSM 400. Three-phase parameters indicated by phases a, b, and c of the PMSM 400 may be represented by being converted to a d-q axis model that is a rectangular coordinate system.

The current obtaining unit 420 detects the current of the PMSM 400 and outputs the detected current to the current controller 330. According to some example embodiments, the current obtaining unit 420 may include a current detector 421 and a coordinate transformation unit 422.

The current detector 421 detects three-phase currents $i_{as}$, $i_{bs}$, and $i_{cs}$ of the PMSM 400. For example, the current detector 421 may be embodied by a shunt resistor or a current transformer. Since the current detected by the current detector 421 corresponds to the three-phase parameter, the detected current is output to the coordinate transformation unit 422 to transform the detected current to the d-q axis model that is a rectangular coordinate system.

The coordinate transformation unit 422 transforms the three-phase currents $i_{as}$, $i_{bs}$, and $i_{cs}$ to be indicated as a d-q axis model and outputs a rotating coordinate system current $i_{dqs}^r$ that is transformed to the d-q axis model to the current controller 330.

The rotor speed and position obtaining unit 430 detects the position of the rotor of the PMSM 400 and estimates the speed and position of the rotor based on the detected position. In some example embodiments, the rotor speed and position obtaining unit 430 may include a position sensor 431 and a speed and position estimator 432.

The position sensor 431 may sense a current position of the rotor of the PMSM 400. For example, the position sensor 431 may sense a current position of the rotor by using a position sensor such as an Encoder, Resolver, or Hall sensor. The position sensor 431 outputs an obtained rotor position to the speed and position estimator 432.

The speed and position estimator 432 estimates the position $\theta_r$ and the speed $\omega_r$ of the rotor according to the rotation of the rotor based on the input current position of the rotor.

The control apparatus 300 controls the driving of the PMSM 400. The driving of the PMSM 400 is controlled by the vector control method. Accordingly, the three-phase parameters indicated by the phases a, b, and c of the PMSM 400 may be represented by being transformed to a d-q axis model that is a rectangular coordinate system.

The control apparatus 300 generates a control pulse signal to control the output voltage of the inverter 410 based on the first command torque $T^*_e$ input to control the driving of the PMSM 400. The control apparatus 300 corrects an error in the output voltage of the inverter 410 through adjustment of the on/off duty ratio $T^*_{abcn}$ of the control pulse signal by reflecting the current $i_{dqs}^r$ detected in the PMSM 400 and the speed $\omega_r$ and position $\theta_r$ of the rotor in the on/off duty ratio of the control pulse signal. The control apparatus 300 may include the torque limiting unit 310, the command current obtaining unit 320, the current controller 330, the pulse width modulation control unit 340, and the magnetic flux controller 100. Since the descriptions about the torque limiting unit 310, the command current obtaining unit 320, the current controller 330, the pulse width modulation control unit 340, and the magnetic flux controller 100 of FIG. 3 may be applied to those of FIG. 4, redundant descriptions will be omitted herein.

The torque limiting unit 310 receives the maximum command magnetic flux $\lambda^*_{max}$ of the PMSM 400 and the first command torque $T^*_e$ input to control the driving of the PMSM 400, and outputs a second command torque $T^{**}_e$ limited by a torque value $T^*_e$ of the first command torque based on the maximum command magnetic flux $\lambda^*_{max}$. The torque limiting unit 310 may include a torque limit value obtaining unit 311 for obtaining a torque limit value based on the maximum command magnetic flux and a second command torque obtaining unit 312.

The torque limit value obtaining unit 311, referring to a first lookup table, obtains a torque limit value $T^*_{limit}$ corresponding to the maximum command magnetic flux $\lambda^*_{max}$. The first lookup table is a data structure in which the torque $T^*_{limit}$ values corresponding to the maximum command magnetic flux $\lambda^*_{max}$ are listed as an array or an associative array. The first lookup table has result values of calculation of the maximum command magnetic flux $\lambda^*_{max}$ or has the torque limit value $T^*_{limit}$ experimentally obtained data as result values.

The second command toque obtaining unit 312 limits the torque value $T^*_e$ of the first command torque according to the torque limit value $T^*_{limit}$ obtained from the torque limit value obtaining unit 311, and obtains the second command torque $T^{**}_e$ having a limited torque value.

Thus, the torque limiting unit 310 outputs the second command torque $T^{**}_e$ limited by a torque value $T^*_e$ of the first command torque, based on the maximum command magnetic flux $\lambda^*_{max}$.

The command current obtaining unit 320 receives the second command torque $T^{}_e$ from the torque limiting unit 310** and obtains a command current value $i_{dqs}^{r*}$ based on the speed $\omega_r$ of the rotor and the second command torque $T^{**}_e$ by using the second lookup table.

The second lookup table corresponds to a data structure in which the command current values $i_{dqs}^{r*}$ are listed as an array or an associative array according to the speed $\omega_r$ of the rotor of the PMSM 400 and the torque value $T^{**}_e$ of the second command torque. The second lookup table obtains a d-axis command current value $I_{ds}^{r*}$ and the q-axis command current value $i_{qs}^{r*}$ according to speed $\omega_r$ of the rotor of the PMSM 400 and the torque value $T^{**}_e$ of the second command torque.

Accordingly, the command current obtaining unit 320, referring to the second lookup table, outputs to the current controller 330 the command current value $i_{dqs}^{r*}$ corresponding to the torque value $T^{}_e$ of the second command torque having a limited torque value according to the maximum magnetic flux and the speed $\omega_r$ of the rotor of the PMSM 400 input to the command current obtaining unit 320**.

The current controller 330 allows a desired current to flow in the PMSM 400. According to some example embodiments, the current controller 330 may generate the first command voltage $v_{dqs\_Ireg}^{r*}$, indicating the error between the command current value $i_{dqs}^{r*}$ and the current value dqs detected in the PMSM 400.

Also, the current controller 330 may receive from the pulse width modulation control unit 340 a feedback of the command voltage $v_{dqs}^{r**}$ calculated from the on/off duty ratio $T^*_{abcn}$ of the control pulse signal, that is, a voltage corresponding to the output voltage to be generated by the inverter 410, and generate the first command voltage $v_{dqs\_Ireg}^{r*}$ by further referring to the command voltage $v_{dqs}^{r**}$.

The pulse width modulation control unit 340 determines the on/off duty ratio $T^*_{abcn}$ of the control pulse signal to control the output voltage of the inverter 410 that drives the PMSM 400, based on the first command voltage $v_{dqs\_Ireg}^{r*}$. According to some example embodiments, the pulse width modulation control unit 340 may include a coordinate transformation unit 341 and a PWM unit 342.

The coordinate transformation unit 341 transforms the first command voltage $v_{dqs\_Ireg}^{r*}$ represented by a d-q axis model to a three-phase command phase voltage $v^*_{abcs}$ represented by an abc-axes model, and outputs the three-phase command phase voltage $v^*_{abcs}$ to the PWM unit 342.

The PWM unit 342 generates the control pulse signal to control the switching device of the inverter 410 so that the inverter 410 may generate the output voltage according to the first command voltage $v_{dqs\_Ireg}^{r*}$. The pulse width modulation control unit 340 determines the on/off duty ratio $T^*_{abcn}$ of the control pulse signal based on the three-phase command phase voltage $v^*_{abcs}$, and outputs the control pulse signal having the determined on/off duty ratio $T^*_{abcn}$ to the inverter 410.

The magnetic flux controller 100 receives the speed $\omega_r$ and position $\theta_r$ of the rotor detected in the PMSM 400, the DC-link voltage $v_{dc}$ of the inverter 410, the first command voltage $v_{dqs\_Ireg}^{r*}$, and the on/off duty ratio $T^*_{abcn}$ of the control pulse signal, and obtains the maximum command magnetic flux $\lambda^*_{max}$ of the PMSM 400.

Accordingly, the PMSM 400 obtains in real time the maximum command magnetic flux of the PMSM 400 according to the position of the rotor of the PMSM 400, and controls the driving of the PMSM 400 based on the obtained maximum command magnetic flux so that the maximum torque may be stably generated in the PMSM 400 regardless of a change in the parameters of the PMSM 400.

Figure 5:
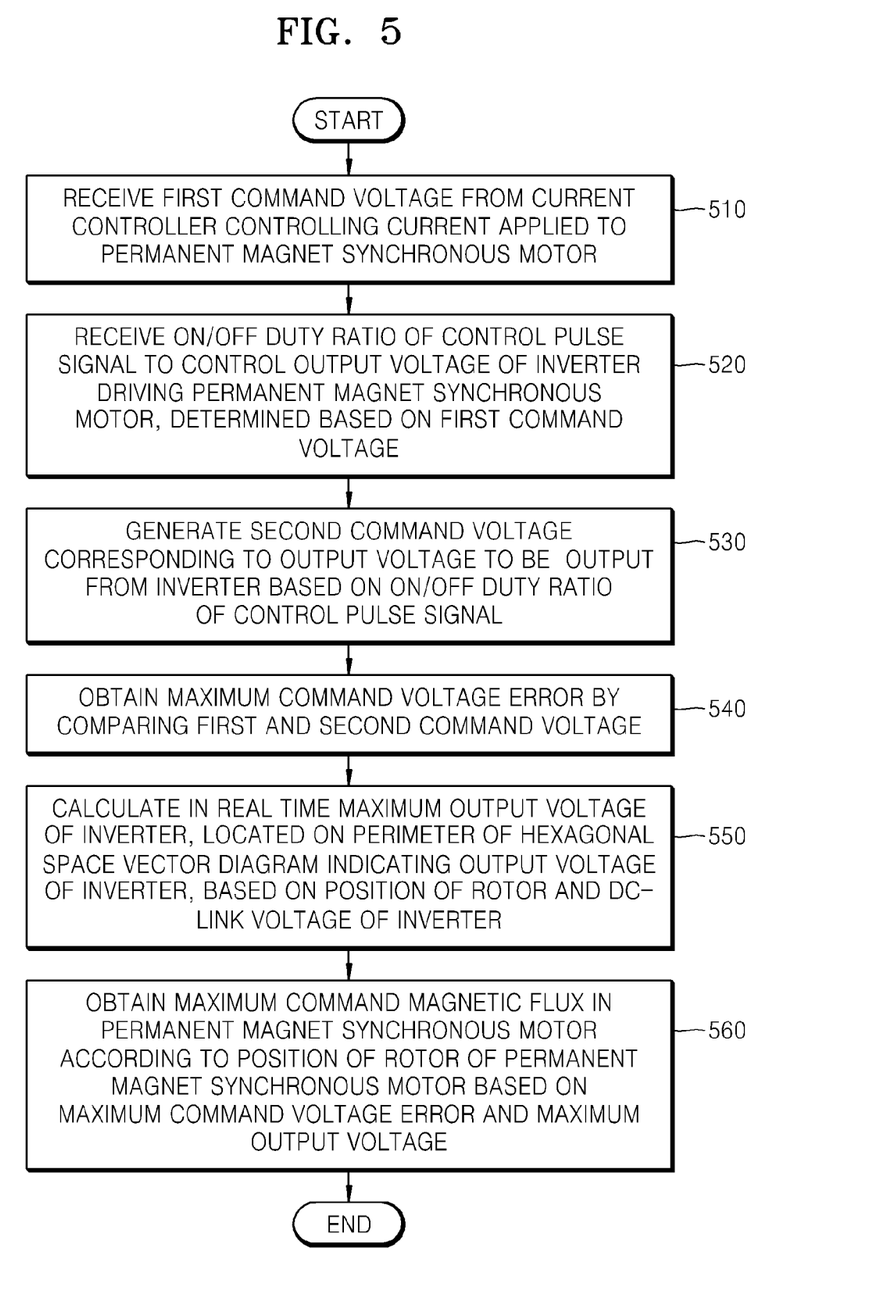
FIG. 5 is a flowchart for explaining a method of obtaining a maximum command magnetic flux of a permanent magnet synchronous motor by using a magnetic flux controller according to some example embodiments.

FIG. 5 is a flowchart for explaining a method of obtaining the maximum command magnetic flux of the PMSM 400 by using the magnetic flux controller 100, according to some example embodiments. Referring to FIG. 5, the method includes operations performed in time series in the magnetic flux controller 100 of FIGS. 1 and 2. Thus, the above descriptions related to the magnetic flux controller 100 of FIGS. 1 and 2 may be applied to the method of FIG. 5 even when the relevant descriptions are omitted in the following description.

In operation 510, the magnetic flux controller 100 receives a first command voltage from a current controller that controls current applied to the PMSM 400.

In operation 520, the magnetic flux controller 100 receives an on/off duty ratio of a control pulse signal to control an output voltage of an inverter that drives the PMSM 400, the on/off duty ratio of the control pulse signal being determined based on the first command voltage.

In operation 530, the command voltage generation unit 110 generates a second command voltage corresponding to the output voltage to be output from the inverter based on the on/off duty ratio of the control pulse signal.

In operation 540, the command voltage error obtaining unit 120 obtains a maximum command voltage error by comparing the first command voltage and the second command voltage. The first command voltage is generated by the current controller and the second command voltage corresponds to an actual output voltage of the inverter. Thus, the magnetic flux controller 100 may correct an error between the first and second command voltages by comparing the first and second command voltages, obtaining the maximum command voltage error, and reflecting the maximum command voltage error in obtaining the maximum command magnetic flux. Accordingly, an output of the PMSM 400 may be improved.

In operation 550, the inverter output voltage calculation unit 130 calculates in real time the maximum output voltage of the inverter according to the position of the rotor based on the position of the rotor and a DC-link voltage of the inverter. The maximum output voltage is located on the perimeter of a hexagonal space vector diagram indicating the output voltage of the inverter.

In operation 560, the command magnetic flux obtaining unit 140 obtains the maximum command magnetic flux of the PMSM 400 according to the position of the rotor of the PMSM 400 based on the maximum command voltage error and the maximum output voltage. In some example embodiments, the command magnetic flux obtaining unit 140 obtains the maximum command voltage by summing the maximum output voltage and the maximum command voltage error, and obtains the maximum command magnetic flux by dividing the maximum command voltage by the speed of the rotor.

Accordingly, the PMSM 400 may obtain in real time the maximum possible command magnetic flux in the PMSM 400 according to the position of the rotor of the PMSM 400.

Figure 6:
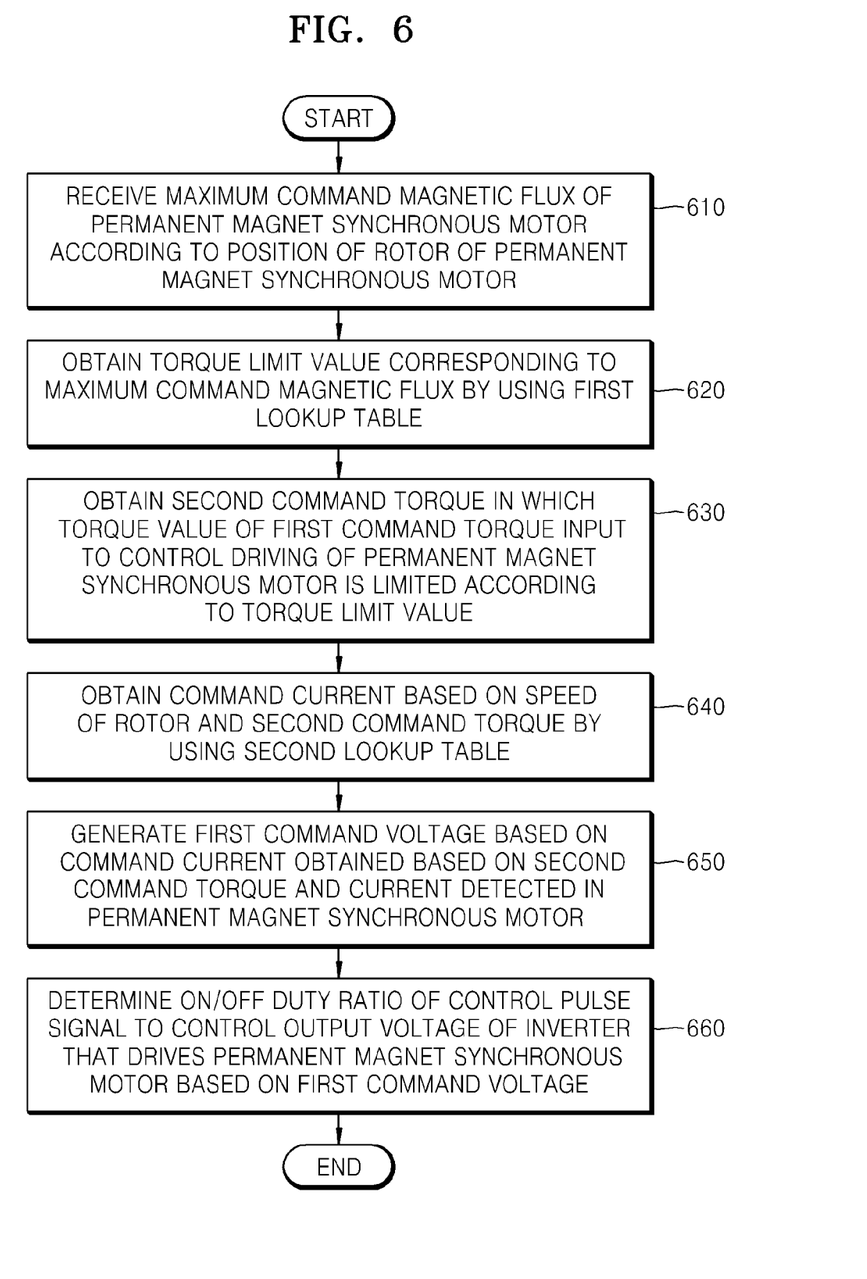
FIG. 6 is a flowchart for explaining a method of controlling driving of a permanent magnet synchronous motor by using a control apparatus according to some example embodiments.

FIG. 6 is a flowchart for explaining a method of controlling driving of a PMSM 400 by using a control apparatus, according to some example embodiments. Referring to FIG. 6, the method includes operations performed in time series in the control apparatus 300 of FIGS. 3 and 4. Thus, the above descriptions related to the control apparatus 300 of FIGS. 3 and 4 may be applied to the method of FIG. 6 even when the relevant descriptions are omitted in the following description.

In operation 610, the torque limiting unit 310 receives the maximum command magnetic flux of the PMSM 400 according to the rotor of the PMSM 400.

In operation 620, the torque limiting unit 310 obtains a torque limit value corresponding to the maximum command magnetic flux by using a first lookup table. The first lookup table is a data structure in which torque limit values corresponding to the maximum command magnetic flux are listed as an array or an associative array. The first lookup table has result values of calculation of the maximum command magnetic flux as torque limit values or has experimentally obtained data as torque limit values.

In operation 630, the torque limiting unit 310 obtains a second command torque in which a torque value of the first command torque input to control the driving of the PMSM 400 is limited according to the torque limit value. The torque limit value corresponds to a value to limit the torque value of the first command torque input based on the maximum command magnetic flux of the PMSM 400 according to the position of the rotor.

In operation 640, the command current obtaining unit 320 obtains a command current value based on the speed of the rotor and the second command torque by using the second lookup table. The second lookup table, like the first lookup table, may have the result values of the calculation of the input values or may have the experimentally obtained data as result values. The second lookup table has command current values corresponding to the speed of the rotor of the PMSM 400 and the torque value of the second command torque, as result values.

In operation 650, the current controller 330 generates a first command voltage based on the command current value obtained based on the second command torque and the current detected in the PMSM 400. The current controller 330 generates the first command voltage in which the error between an actual current flowing in the PMSM 400 and the command current is corrected.

In operation 660, the pulse width modulation control unit 340 determines an on/off duty ratio of a control pulse signal to control the output voltage of the inverter that drives the PMSM 400 based on the first command voltage. The control pulse signal corresponds to a signal to control a switching device of the inverter so that the inverter generates the output voltage according to the first command voltage.

Accordingly, the control apparatus 300 controls the driving of the PMSM 400 based on the maximum command magnetic flux of the PMSM 400 according to the position of the rotor and thus the maximum possible torque in the PMSM 400 may be generated regardless of a change in the parameters of the PMSM 400.

As described above, according to the one or more of the above example embodiments, since the maximum command magnetic flux of the PMSM is obtained in real time according to the position of the rotor of the PMSM, the PMSM may stably generate the maximum possible torque in the PMSM regardless of a change in the parameters of the PMSM.

In addition, other example embodiments may also be implemented through computer readable code/instructions in/on a medium, e.g., a computer readable medium, to control at least one processing element to implement any of the above described example embodiments. The medium can correspond to any medium/media permitting the storage and/or transmission of the computer readable code.

The computer readable code may be recorded/transferred on a medium in a variety of ways, with examples of the medium including recording media, such as magnetic storage media (e.g., read-only memory (ROM), floppy disks, hard disks, etc.) and optical recording media (e.g., compact disc (CD)-ROMs, or digital video discs (DVDs)), and transmission media such as Internet transmission media. Thus, the medium may be such a defined and measurable structure including or carrying a signal or information, such as a device carrying a bitstream according to one or more example embodiments. The media may also be a distributed network, so that the computer readable code may be stored/transferred and executed in a distributed fashion.

While example embodiments have been particularly shown and described, it will be understood by those of ordinary skill in the art that various changes in form and details may be made therein without departing from the spirit and scope of the present invention as defined by the following claims.

What is claimed is:

1. A method of obtaining a maximum magnetic flux of a permanent magnet synchronous motor, the method comprising:

receiving a first command voltage from a current controller to control current applied to the permanent magnet synchronous motor;

receiving an on/off duty ratio of a control pulse signal to control an output voltage of an inverter that drives the permanent magnet synchronous motor, the on/off duty ratio being determined based on the first command voltage;

generating a second command voltage corresponding to the output voltage to be output from the inverter based on the on/off duty ratio of the control pulse signal;

obtaining a maximum command voltage error by comparing the first and second command voltages;

calculating in real time a maximum output voltage of the inverter according to a position of a rotor of the permanent magnet synchronous motor, based on the position of the rotor and a direct current (DC)-link voltage of the inverter; and obtaining the maximum command magnetic flux of the permanent magnet synchronous motor according to the position of the rotor based on the maximum command voltage error and the maximum output voltage of the inverter.

2. The method of claim 1,
wherein the maximum output voltage is located on a perimeter of a hexagonal space vector diagram indicating the output voltage of the inverter.

3. The method of claim 2, wherein the maximum output voltage is calculated by an equation, $$V_{max\_hexa} = \frac{2 \cdot v_{dc}}{\sqrt{3} \cdot \sin\theta_{r\_rem} + 3 \cdot \sin\theta_{r\_rem}},$$

wherein $V_{max\_hexa}$ denotes the maximum output voltage of the inverter according to the position of the rotor, $v_{dc}$ denotes the DC-link voltage of the inverter, and $\theta_{r\_rem}$ denotes a remainder when the position of the rotor is divided by 60°.

4. The method of claim 2, wherein the obtaining of the maximum command magnetic flux comprises:
obtaining a maximum command voltage by summing the maximum output voltage and the maximum command voltage error; and
obtaining the maximum command magnetic flux by dividing the maximum command voltage by a speed of the rotor.

5. The method of claim 1, wherein in the obtaining of the maximum command voltage error, the maximum command voltage error is obtained by using a proportional-integral controller having an anti-windup function.

6. A non-transitory computer readable storage medium with an executable program stored thereon, wherein the program instructs a microprocessor or controller to perform the method of claim 1.

7. A magnetic flux controller for obtaining a maximum magnetic flux of a permanent magnet synchronous motor, the magnetic flux controller comprising: a command voltage error obtaining unit configured to obtain a maximum command voltage error by comparing a first command voltage, input from a current controller to control current applied to the permanent magnet synchronous motor, and a second command voltage;
a command voltage generation unit configured to generate the second command voltage corresponding to an output voltage to be output from an inverter based on an on/off duty ratio of a control pulse signal to control the output voltage of the inverter that drives the permanent magnet synchronous motor;

an inverter output voltage calculation unit configured to calculate a maximum output voltage of the inverter according to a position of a rotor of the permanent magnet synchronous motor, based on the position of the rotor and a direct current (DC)-link voltage of the inverter; and a command magnetic flux obtaining unit configured to obtain the maximum command magnetic flux of the permanent magnet synchronous motor according to the position of the rotor of the permanent magnet synchronous motor based on the maximum command voltage error and the maximum output voltage of the inverter.

8. The magnetic flux controller of claim 7,
wherein the inverter output voltage calculation unit is further configured to calculate in real time the maximum output voltage located on a perimeter of a hexagonal space vector diagram indicating the output voltage of the inverter.

9. The magnetic flux controller of claim 8, wherein the inverter output voltage calculation unit is further configured to calculate the maximum output voltage by an equation, $$V_{max\_hexa} = \frac{2 \cdot v_{dc}}{\sqrt{3} \cdot \sin\theta_{r\_rem} + 3 \cdot \sin\theta_{r\_rem}},$$

wherein $V_{max\_hexa}$ denotes the maximum output voltage of the inverter according to the position of the rotor, $v_{dc}$ denotes the DC-link voltage of the inverter, and $\theta_{r\_rem}$ denotes a remainder when the position of the rotor is divided by 60°.

10. The magnetic flux controller of claim 8, wherein the command magnetic flux obtaining unit is further configured to obtain a maximum command voltage by summing the maximum output voltage and the maximum command voltage error, and is further configured to obtain the maximum command magnetic flux by dividing the maximum command voltage by a speed of the rotor.

11. The magnetic flux controller of claim 7, wherein the command voltage error obtaining unit is further configured to obtain the maximum command voltage error by using a proportional-integral controller having an anti-windup function.

12. The magnetic flux controller of claim 7, wherein the command magnetic flux obtaining unit is further configured to output the maximum command magnetic flux based on a speed of the rotor of the permanent magnet synchronous motor.

13. The magnetic flux controller of claim 12,
wherein the inverter output voltage calculation unit is further configured to receive the position of the rotor, and is further configured to output the maximum output voltage of the inverter based on the position of the rotor.

14. The magnetic flux controller of claim 7, wherein the command voltage generation unit is further configured to receive the direct current (DC)-link voltage of the inverter, and
wherein the command voltage generation unit is further configured to output the second command voltage based on the on/off duty ratio of the control pulse signal and the DC-link voltage of the inverter.

15. The magnetic flux controller of claim 14,
wherein the inverter output voltage calculation unit is further configured to receive the position of the rotor and the DC-link voltage of the inverter, and is further configured to output the maximum output voltage of the inverter based on the position of the rotor and the DC-link voltage of the inverter.

* * * * *